United States Patent
Zhang et al.

(10) Patent No.: US 7,408,971 B2
(45) Date of Patent: Aug. 5, 2008

(54) LONGITUDINALLY PUMPED SOLID STATE LASER AND METHODS OF MAKING AND USING

(75) Inventors: Jian Zhang, South Setauket, NY (US); Jie Song, Port Jefferson, NY (US); Bo Guo, Dix Hills, NY (US); Kuo-Ching Liu, Mt. Sinai, NY (US)

(73) Assignee: Quantronix Corporation, East Setauket, NY (US)

( * ) Notice: Subject to any disclaimer, the term of this patent is extended or adjusted under 35 U.S.C. 154(b) by 0 days.

(21) Appl. No.: 11/364,121

(22) Filed: Feb. 28, 2006

(65) Prior Publication Data
US 2007/0201532 A1  Aug. 30, 2007

(51) Int. Cl.
H01S 3/091 (2006.01)
H01S 3/092 (2006.01)
H01S 3/081 (2006.01)

(52) U.S. Cl. .............................. 372/71; 372/93; 372/99; 372/100

(58) Field of Classification Search .................. 372/93, 372/10, 71, 94, 98, 99, 100, 101, 102, 103, 372/106
See application file for complete search history.

(56) References Cited

U.S. PATENT DOCUMENTS

| | | | |
|---|---|---|---|
| 3,921,096 A * | 11/1975 | Chenausky et al. ........... 372/95 |
| 4,703,491 A * | 10/1987 | Lim ............................. 372/93 |
| 4,908,832 A | 3/1990 | Baer |
| 5,148,445 A | 9/1992 | Liu et al. |
| 5,241,551 A * | 8/1993 | Chernoch et al. ............. 372/22 |
| 5,271,031 A * | 12/1993 | Baer ............................. 372/93 |
| 5,455,838 A | 10/1995 | Heritier et al. |
| 5,579,422 A | 11/1996 | Head et al. |

(Continued)

OTHER PUBLICATIONS

Zhang et al., "Efficient TEM$_{00}$ Operation of Nd:YVO$_4$ laser end pumped by fibre-coupled diode laser," Electronics Letters Online No. 19970518, Dec. 4, 1996.

(Continued)

*Primary Examiner*—Minsun Harvey
*Assistant Examiner*—Joshua King
(74) *Attorney, Agent, or Firm*—Edwards Angell Palmer & Dodge LLP

(57) ABSTRACT

A laser apparatus for producing a laser light beam can include a gain medium; a pump light source to provide a pump light beam to the gain medium; a first reflector disposed between the first gain medium and the first pump light source and spaced apart from a gain portion of the first gain medium; a second reflector; and an output coupler. The first reflector is substantially reflective to the laser light beam and substantially transmissive to the pump light beam. The first and second reflectors and the output coupler define a folded beam path having a first portion and a second portion. The first portion of the beam path extends from the first reflector to the second reflector through the gain medium and the second portion of the beam path extends from the first reflector to the output coupler through the gain medium. The first and second beam paths define, within the gain medium, a non-zero folding angle. Optionally, the laser apparatus can include a second pump light source that can pump the same, or a second, gain medium.

21 Claims, 6 Drawing Sheets

U.S. PATENT DOCUMENTS

| | | | |
|---|---|---|---|
| 5,590,147 A * | 12/1996 | Hobbs et al. | 372/75 |
| 5,651,021 A | 7/1997 | Richard et al. | |
| 5,696,786 A * | 12/1997 | Durkin et al. | 372/75 |
| 5,774,488 A | 6/1998 | Kmetec | |
| 5,798,877 A | 8/1998 | Nightingale et al. | |
| 5,812,308 A * | 9/1998 | Kafka et al. | 359/346 |
| 5,825,551 A | 10/1998 | Clarkson et al. | |
| 5,912,912 A * | 6/1999 | Caprara et al. | 372/25 |
| 5,966,391 A * | 10/1999 | Zediker et al. | 372/22 |
| 6,002,695 A * | 12/1999 | Alfrey et al. | 372/22 |
| 6,101,201 A * | 8/2000 | Hargis et al. | 372/36 |
| 6,115,185 A | 9/2000 | Du et al. | |
| 6,115,402 A * | 9/2000 | Caprara | 372/101 |
| 6,151,341 A | 11/2000 | Bull et al. | |
| 6,222,869 B1 | 4/2001 | Marshall et al. | |
| 6,229,829 B1 * | 5/2001 | Yin | 372/22 |
| 6,366,596 B1 * | 4/2002 | Yin et al. | 372/92 |
| 6,584,134 B2 * | 6/2003 | Yin et al. | 372/92 |
| 6,587,487 B2 * | 7/2003 | Yin | 372/22 |
| 6,600,605 B1 | 7/2003 | Anikitchev | |
| 2002/0036821 A1 * | 3/2002 | Hollemann et al. | 359/342 |
| 2006/0061854 A1 * | 3/2006 | Dane et al. | 359/333 |

OTHER PUBLICATIONS

Chen et al., "Efficient high-power diode-end-pumped $TEM_{00}$ $Nd:YVO_4$ laser with a planar cavity," Optics Letters, vol. 25, No. 14, Jul. 15, 2000.

Chen, "Design Criteria for Concentration Optimization in Scaling Diode End-Pumped Lasers to High Powers: Influence of Thermal Fracture," IEEE Journal of Quantum Electronics, vol. 35, No. 2, Feb. 1999.

Liu et al., "Improvement of passive Q-switching performance reached with a new Nd-doped mixed vanadate crystal $Nd:Gd_{0.64}Y_{0.36}VO_4$," Optics Letters, vol. 28, No. 23, Dec. 1, 2003.

Ogawa et al., "Efficient laser performance of $Nd:GdVO_4$ crystals grown by the floating zone method," Optics Letters, vol. 28, No. 23, Dec. 1, 2003.

Lupei et al., "Highly efficient 1063-nm continuous-wave laser emission in $Nd:GdVO_4$," Optics Letters, vol. 28, No. 23, Dec. 1, 2003.

Peng et al., "Study of the mechanical properties of $Nd:YVO_4$ crystal by use of laser interferometry and finite-element analysis," Applied Optics, vol. 40, No. 9, Mar. 20, 2001.

Thermo-Optic Effects and Heat Removal; End-Pumped Configurations.

* cited by examiner

LONGITUDINALLY PUMPED SOLID STATE LASER AND METHODS OF MAKING AND USING

FIELD

The invention is directed to longitudinally pumped solid-state lasers and methods of making and using the lasers. In addition, the invention is directed to lasers that efficiently generate a high power, linearly polarized, and circularly symmetrical output laser beam and methods of making and using the lasers.

BACKGROUND

High power, diode laser pumped, solid-state lasers have many potential applications, for example, ceramic or silicon wafer scribing and drilling; diamond cutting and scribing; and laser marking and engraving. Examples of such lasers include $TEM_{oo}$ or low-order-mode (LOM) devices with either continuous wave (CW) or Q-switched output at, for example, 1 μm or at the $2^{nd}$, $3^{rd}$ or $4^{th}$ harmonic wavelength.

With the rapid development of diode-pumped solid-state lasers during the past two decades, a number of approaches have been investigated with the goal of increasing the overall efficiency of such devices. Pumping schemes using high power fiber coupled diode lasers have been the most popular and efficient approaches for end pumping. Such schemes have shortcomings such as complexity, reliability (pointing and damage), limitations on power scale up, and higher cost.

To achieve high optical-to-optical efficiency, good mode matching is preferred. Mode matching increases the coupling (e.g., overlapping) between the $TEM_{oo}$ mode of the laser resonator and the excited volume in the gain medium within the resonator. In general, there are two basic ways to pump the laser gain medium (crystal): end pumping (longitudinally pumped) and side pumping (transversely pumped). Side pumped lasers have been developed using $Nd^{3+}$ doped crystals, such as Nd:YLF and Nd:YAG. The side pumping (transversely pumped) scheme generally has better scalability to higher power levels because the pumping radiation from a diode array or a fiber coupled laser diode is directed through a lens or optical system into the laser medium normally perpendicular to the laser cavity mode. With side pumping, strong pumping absorption is preferentially near the side surface of the gain medium while the laser cavity mode is normally located in the interior of the gain medium. For this reason, mode matching can be poor compared to end pumping and can result in low efficiency (typically 15 to 30%). End pumping (longitudinally pumped) remains attractive because of the potential of good mode matching for a highly efficient diode-pumped laser system.

The laser resonator mode cross section is often circular in shape because regular symmetric resonator optics and a circular beam are preferred for many laser applications. The pumping source, for example, a high power diode laser bar, often has an asymmetric beam shape. One example of a pumping source is a 40W laser bar, such as Coherent Product No. 1024355, with a 10×0.001 mm emitting window, 10×35° full divergence angle (FWHM—full width, half maximum) and with $M^2$~1 in the fast axis direction while more than a thousand in the slow axis direction. In such instances, pumping beam shaping is used. Diode laser beam shaping technologies have been developed using reflective optics or refractive optics. Typically, beam shaping reduces $M^2$ along the slow axis while sacrificing beam quality along the fast axis in order to match $M^2$ in the two directions to form a circular beam. Special optics or special arrangements are used to perform the beam shaping. Focusing or delivery optics are used to guide the beam to pump the gain medium.

Optical fiber, due to its symmetric cross section and flexible characteristic, is widely used for diode laser beam shaping and pumping beam delivery. It has desirable characteristics for end pumping: circular beam shape and quasi-flat top intensity distribution (by multimode fiber or fiber bundle). This can lead to a preferred pumping volume with a parabolic temperature distribution profile. Fiber delivery also has its shortcomings. First, there is system complexity: at the diode laser input side, beam shaping and coupling optics are needed, while at the pumping side, a collimator and focusing optics are needed. Second, loss from the fiber coupling and delivery system is typically 25% or more. Third, reliability is a concern for laser stability because of pointing variation in the pumping beam if the fiber is moved or bent while the laser system is in operation. Fourth, optical damage at the fiber input surface, or mechanical damage due to over bending, twisting or other stress, can cause problems. Fifth, optical damage of the gain medium can produce a limit for pump power scale up at each end of the gain medium. For example, the damage threshold is approximately 19.25 W/mm² at 1% doping level for one of the most efficient laser crystals, $Nd:YVO_4$.

BRIEF SUMMARY

One embodiment is a laser apparatus for producing a laser light beam. The laser apparatus includes a gain medium; a pump light source to provide a pump light beam to the gain medium; a first reflector disposed between the first gain medium and the first pump light source and spaced apart from a gain portion of the first gain medium; a second reflector; and an output coupler. The first reflector is substantially reflective to the laser light beam and substantially transmissive to the pump light beam. The first and second reflectors and the output coupler define a folded beam path having a first portion and a second portion. The first portion of the beam path extends from the first reflector to the second reflector through the gain medium and the second portion of the beam path extends from the first reflector to the output coupler through the gain medium. The first and second beam paths define, within the gain medium, a non-zero folding angle. Optionally, the laser apparatus can include a second pump light source that can pump the same, or a second, gain medium. Additional pump light sources and/or gain media can be included.

Another embodiment is a method of using a laser apparatus to generate a laser light beam. The method includes providing a laser cavity having a gain medium; a first reflector spaced apart from a gain portion of the first gain medium; a second reflector; and an output coupler. The first and second reflectors and the output coupler define a folded beam path having a first portion and a second portion. The first portion of the beam path extends from the first reflector to the second reflector through the gain medium and the second portion of the beam path extends from the first reflector to the output coupler through the gain medium. The first and second beam paths define, within the gain medium, a non-zero folding angle. The gain medium is pumped using a pump light beam passing through the first reflector to the gain medium. The first reflector is substantially reflective to the laser light beam and substantially transmissive to the pump light beam. Optionally, the laser apparatus can include a second pump light source that can pump the same, or a second, gain medium. Additional pump light sources and/or gain media can be included.

Yet another embodiment is a laser cavity including a gain medium; a first reflector; a second reflector; and an output coupler. The first reflector is substantially reflective to a laser light beam and substantially transmissive to a pump light beam and is spaced apart from a gain portion of the first gain medium. The first and second reflectors and the output coupler define a folded beam path having a first portion and a second portion. The first portion of the beam path extends from the first reflector to the second reflector through the gain medium and the second portion of the beam path extends from the first reflector to the output coupler through the gain medium. The first and second beam paths define, within the gain medium, a non-zero folding angle. The laser cavity can optionally include more than one gain medium.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
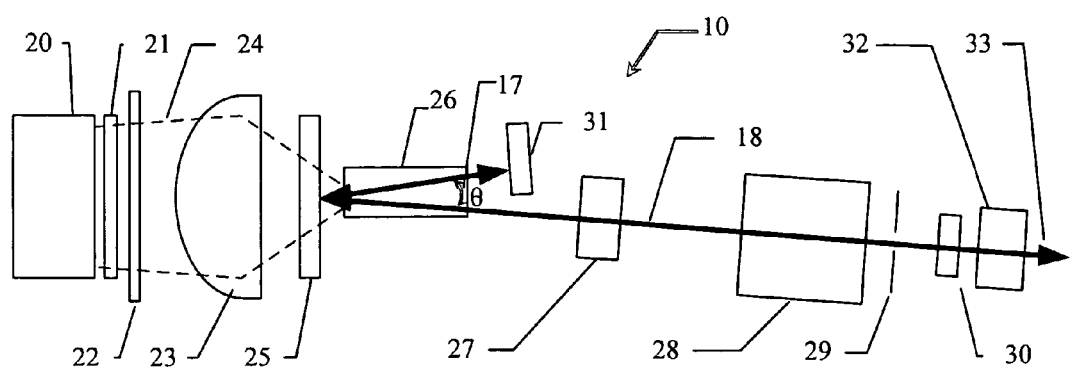
FIG. 1 is a schematic diagram of one embodiment of a longitudinally end pumped laser, according to the invention.

The invention is directed to longitudinally pumped solid-state lasers and methods of making and using the lasers. In addition, the invention is directed to lasers that efficiently generate a high power, linearly polarized, and circularly symmetrical output laser beam and methods of making and using the lasers.

A laser apparatus can include an end pumping (longitudinally pumped) scheme using a folded resonator design with a V-shaped path through the pumped gain medium. In at least some embodiments, this design has one or more advantages such as high efficiency, reliability, good mode matching, and/or good gain guiding. In at least some embodiments, the design can also include compensation for one or both of gain and thermal asymmetry. Such compensation can include, for example, flipping the right and left sides of the laser beam by the folding reflection. Other potential advantages of at least some embodiments include better power scale-up, high damage threshold, and/or superior stability with active thermal management over a portion of the cavity (or even the whole cavity). At least some embodiments of the diode pumped laser have high power, high efficiency LOM and/or $TEM_{oo}$ (up to, for example, 10 to 40W or higher) modes with reliable, circularly symmetrical, and linearly polarized output.

A laser, such as a high power, high efficiency longitudinally pumped solid-state laser, can be formed using at least one highly reflective (HR) mirror and an output coupler (OC). These mirrors, or other reflectors, define a laser resonator with a folded resonator cavity optical axis. A pump light source provides a pump light beam, for example, a linearly polarized beam, to the laser gain medium, producing a (preferably, substantially circular) output beam which can be linearly polarized, partially polarized, or unpolarized, if desired. For some applications, polarized or partially polarized laser beams may be preferred. For example, a linearly polarized beam may be preferred for cutting applications (like diamond cutting).

Components which "substantially transmit" a wavelength or polarization transmit at least 70% of that wavelength or polarization and preferably transmit at least 95% of the wavelength or polarization. Components which "substantially reflect" a wavelength or polarization reflect at least 70% of that wavelength or polarization and preferably reflect at least 95% of the wavelength or polarization.

In at least one embodiment, the system utilizes relatively simple refractive beam shaping optics to couple the pump light beam into the gain medium at a flat surface. In at least some instances, the coupling efficiency of the generated pump power to the absorbed pump power can be at least 95%, while a fiber coupled scheme typically has an efficiency of 71% or less. In at least some embodiments, a larger pumping surface area (for example, an elliptical shape with major axis/minor axis ratio in the range of approximately 1 to 4) and/or preferred doping level (e.g., 0.6% or less) can lead to cooling and reliability benefits. For example, one embodiment has a damage threshold of approximately 140 W, which is 2.4 times that of some fiber coupled end pump schemes.

In at least some embodiments, the optical efficiency of the laser can be at least 40% for low order mode (e.g., LOM, $M^2$ about 4 to 5) and at least 27% for diffraction limited (e.g., $TEM_{00}$, $M^2<1.2$) operations. While a $TEM_{00}$ beam may be preferred for some applications, not all laser applications need a TEM$_{00}$ beam. Some applications, like laser marking, engraving, and some thermal treatment applications may utilize a LOM beam or a flat top beam.

Referring to FIG. 1, a longitudinally pumped laser head 10 includes a first reflector 25 (e.g., a folding mirror), a second reflector 31 (e.g., a resonator mirror), an output coupler 30, a gain medium 26, a resonator optical axis 18, and a pump light source 20. The pump light source 20 supplies a pump light beam 24 to the gain medium 26. A variety of pump light sources can be used including one or more lasers, light-emitting diodes, lamps (e.g., arc lamps), or the like. One example of a suitable pump light source is a high power diode bar such as a 40 W diode bar, for example, part number 0204-02128 available from Quantronix Corporation, East Setauket, N.Y. The pump light source can produce a pump light beam having a wavelength suitable for pumping the selected gain medium 26. In one embodiment, a preferred wavelength for the pump light source 20 is in the range of 780 to 815 nm. Peak absorption wavelengths of specific laser gain medium crystals are: Nd:YAG, Nd:YVO$_4$, Nd:GdVO$_4$-808.5 nm; Nd:YLF-797 nm; and Tm:YAG-785 nm. In some instances, the wavelength of the output beam from the pump light source 20 may be tuned (for example, temperature tuned) to improve absorption in the gain medium.

In at least some embodiments, the pump light source 20 has asymmetrical beam characteristics along two perpendicular axes. One example of a suitable pump light source has an array of emitters of the size 150×1 μm each with 500 μm spacing for a 30% filling factor device. For a 50% filling factor device, the size of the emitter is 200×1 μm with 400 μm spacing. Normally the beam characteristics in the 1 μm direction, often called the fast axis, are near diffraction limited; while the beam characteristics in the long direction, often called the slow axis, are 25 to 40 times the diffraction limit for each emitter in the array and overall 800 to 1400 times.

Figure 2:
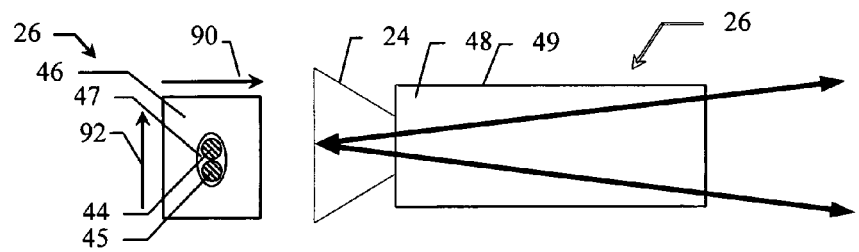
FIG. 2 contains schematic diagrams of an end view and a top view of the gain medium and pump light beam of FIG. 1.

The laser apparatus may utilize optical components, for example, simple refractive beam shaping optics, to couple the pump light beam 24 into the gain medium 26, preferably at a flat surface of the gain medium. For example, cylindrical micro lens 21 can be used to collimate and image the pump light beam 24 in the fast axis direction onto the optical end face 46 of the gain medium 26 (see FIG. 2). Another cylindrical lens 23 can be used to focus and image pump light beam 24 in the slow direction onto the optical end face of laser medium 26. Using lenses 21 and 23, the pump beam 24 is provided at the end face 46 at a particular ratio R of the major/minor axes of the focal spot 47 as shown in FIG. 2. In at least some embodiments, the ratio R is preferably in the range of 1 to 4. For example, a preferred ratio R is about 1.5 for pumping power on the order of 30 to 50 W and a pump spot size of 1×1.5 mm. Other components can be used to image the pump light beam onto the end face of the gain medium and include, but are not limited to, prisms and diffraction optics. Those of skill in the art will recognize this pumping geometry as end-pumped or longitudinally pumped.

The polarization of the pump light beam, if it is polarized, can be either in the fast axis (TM mode) or in the slow axis (TE mode) and can depend on the pump light source 20 and associated optics. Optionally, a half wave plate 22, selected for the pump light wavelength, can be used to control the orientation of the polarization plane to match the desired absorption properties in the laser gain medium 26. Some laser gain medium crystals, like Nd:YVO$_4$, Nd:GdVO$_4$ and Nd:YLF, are sensitive to the pump polarization while some crystals, like Nd:YAG and Tm:YAG, are not sensitive to pump beam polarization.

The resonator design includes two cavity reflectors 31 and 25 and output coupler 30 to provide a folded (e.g., "V" shaped) beam path inside the gain medium 26 near the flat pumped surface 46. Such a design can improve mode volume matching. The folded path optionally compensates for one or both of gain and thermal asymmetry by flipping the right and left side of the laser beam after the reflection. In the vertical direction (perpendicular to the fold plane) the laser mode is gain guided. The folding angle, θ, 17 is non-zero and is preferably at least 4 or 5 degrees. In one embodiment, the folding angle is in the range of 4 to 40° or 5 to 30°, and preferably in the range of 10 to 20°. The folding angle can be determined based on the central portions of the laser beam path. The folded cavity configuration can result in good mode matching of the pumped gain volume illustrated by focal spot 47 and the folded beam path. The entrance points 44 and 45 (see FIG. 2) of the beam path from the first reflector into the gain medium are generally not identically overlapping and preferably do not substantially overlap. In at least some embodiments, the resulting laser has an optical-to-optical (e.g., pump light beam power to laser light beam power) conversion efficiency of 40% or greater and preferably 50% or more.

The second reflector 31 can be any suitable reflective element, such as a mirror. The second reflector 31 is preferably highly reflective at the laser wavelength.

The first reflector 25 is typically disposed between the gain medium 26 and the pump light source 20 and is preferably anti reflective (AR) coated (for the pump light wavelength) on the side nearest the pump light source. The first reflector is typically highly transmissive (HT—at least 98%) at the pump light wavelength and highly reflective (HR—at least 98%, preferably at least 99%, and more preferably at least 99.7%) at the laser wavelength. These properties can be produced, for example, by selection of a suitable reflector or by one or more coatings on the first reflector.

The first reflector 25 is spaced apart from a gain portion of the gain medium. In some instances, the first reflector can be an element separate from the gain medium 26. In other instances, the first reflector may be formed on the gain medium 26 where there is separation between the gain portion of the gain medium and the first reflector (e.g., where the first reflector is formed on an undoped cap portion of the gain medium, as discussed below.) For example, coatings may be placed on the end of the gain medium 26 or an optical element with the desired transmission/reflection properties can be attached to the end of the gain medium. If desired, more than one first reflector can be used.

Figure 3:
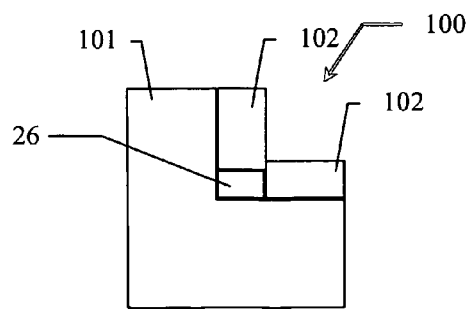
FIG. 3 is a schematic cross-section of a laser gain medium mounted in a heat sink assembly, according to the invention.

Positioned near the "V"-shaped folding tip of the optical axis 18 is the gain medium 26 (e.g., a laser crystal) preferably mounted in a heat sink 100 (see FIG. 3). Examples of suitable gain media include semiconductor crystals. Such crystals include, but are not limited to, Nd:YAG, Nd:YVO$_4$, Nd:YPO$_4$, Nd:GVO$_4$, Nd:LSB, Nd:BEL, Tm:YAG, and Nd:YALO. An optional intracavity polarizing element 27 can be used with selected gain media, such as Nd:YAG. A preferred gain medium material is Nd:YVO$_4$, available from Litton-Airtron, Charlotte, N.C., or Castech, Fuzhou, China. In one embodiment, the atomic percentage of Nd in this crystal is in the range of 0.1 to 3.0 at. %, preferably about 0.1 to 0.5 at. %. One preferred embodiment utilizes 0.12 atomic percent, while another utilizes approximately 0.3 at. % Nd.

For many laser crystals, the indices of refraction of the crystal vary as a function of temperature, particularly in high power, end-pumped geometries. With higher pump powers (e.g., about 20 W or more) the effect of thermally induced phase aberrations can be significant. For example, the variation of the indices of refraction is on the order of about $3 \times 10^{-6}/°$ K for light polarized parallel to the "c" axis 90 (see FIG. 2) of Nd:YVO$_4$.

It is known that the thermal aberrations in Nd:YLF are approximately an order of magnitude less than those of high aberration materials in similar end-pumped geometries because dn/dT is much smaller for Nd:YLF than for Nd:YAG and Nd:YVO$_4$. Nd:YVO$_4$ is an attractive material because, compared to Nd:YLF, it exhibits high gain and a short upper state lifetime which is desirable for Q-switched operation to achieve stable operation at, for example, 20 to 400 kHz with short pulses (for example, approximately 10 ns or shorter). Nd:YAG has intermediate gain and an intermediate upper state lifetime which is also useful. Nd:YVO$_4$ is also suitable for diode pumping because its absorption coefficient at the pump light wavelength of 808.5 nm is high with pump polarization along the "c" axis of the crystal, permitting efficient coupling of the pump light beam 24 into the gain medium 26. In one embodiment, Nd:YVO$_4$ is used for short pulse, high repetition rate Q-switching, and also allows oscillations due to optical feedback to damp out more quickly than Nd:YLF. This can be particularly useful for high speed image recording and other applications.

Optionally, laser head 10 includes a Q-switch 28. As an example, an acousto-optic Q-switch can be made of quartz crystal or high index glass. The diffraction efficiency of this device is preferably adequate to diffract the laser beam off the optical axis 18 in the cavity. To get shorter pulses (preferred for many applications), the rise and fall time of the acoustic wave in the device is preferably suitably fast to achieve efficient energy extraction from the laser.

Also optionally included in the laser head 10 is an aperture 29 to improve the generation of a TEM$_{00}$ output beam 33, if desired. The aperture 29 may be less useful if the cavity is optimized or otherwise suitable for mode matching and pump gain guiding.

In at least some embodiments, the laser output beam is typically a circular beam as a result of controlled thermal effects and good mode matching and gain guiding. To increase beam roundness or to produce a particular shape of the output beam cross-section, a beam shaper 32 can be added. The beam shaper 32 can be, for example, an anamorphic prism pair. A suitable beam shaper includes one or more prisms made of fused silica with magnification of 1.4 to 2.2×, or a cylindrical telescope with desired magnification.

The length of the cavity defined by the laser head 10 can vary and may depend on the application. In at least some embodiments, a suitable length is in the range of about 5 to 50 cm. For example, in one embodiment the cavity length is about 17 cm.

A polarizer 27 can optionally be included but may be less useful if the laser gain medium crystal is Nd:YVO$_4$ or Nd:GdVO$_4$ due to strong natural birefringence.

In FIG. 2, one embodiment of the gain medium 26 is shown having an end face 46, a "c" axis crystal face 48 normal to a "c" axis 90 of gain medium 26, and an "a" axis crystal face 49 normal to an "a" axis 92 of gain medium 26. This terminology refers to a uniaxial gain medium like Nd:YVO$_4$ or Nd:GdVO$_4$; the reference to different "a" and "c" axes does not apply to Nd:YAG or other isotropic gain media. Faces 46, 48 and 49 have corresponding opposing faces, not shown, and all of these faces are preferably flat and generally parallel, but may be wedged in an amount of about 1٠ or less.

The geometry of the gain medium 26 can vary. Although a cylindrical geometry is popular (such as for Nd:YAG), non-cylindrical is preferred in some embodiments. Suitable non-cylindrical geometries include, but are not limited to, cubic, rectangular, hexagonal, and octagonal geometries. In one embodiment, the gain medium 26 has an end face 46 with dimensions of at least 1.5 mm, and preferably in the range of about 3 to 4 mm. Additionally, in some embodiments having a rectangular or cubic geometry, a length of about 3 to 14 mm is preferable, and a more preferable length is about 7 to 9 mm.

In one embodiment, a crystal Nd:YVO$_4$ slab is used for the gain medium. The slab is 1.75 mm along the π polarization direction ("c" axis) while the dimension in the "a" axis is 3 mm. The pump laser induced thermal lens is inversely proportional to the thermal optical coefficient (change of refractive index with temperature), and the thermal optical coefficient of Nd:YVO$_4$ (dn/dT)$_\sigma$/(dn/dT), is approximately 2.8. Under the same temperature gradient, the thermal lens along the π direction ("c" axis) is about 3 times weaker than that along the σ direction ("a" axis). This Nd:YVO$_4$ slab design can benefit by having a cooling channel (temperature gradient) along the π direction to reduce and balance the thermal lens in the two (σ, π) directions.

In other words, the optical, thermal and mechanical characteristics of the Nd:YVO$_4$ crystal 26 are different along the "a" and "c" axes. The thermal expansion coefficient in a direction parallel to the "a" axis can be about 2.5 times smaller than that parallel to the "c" axis. The variation of the index of refraction (thermal optical coefficient, dn/dT) as a function of temperature is different by about a factor of about 2.8 along the "a" and "c" axes. Because Nd:YVO$_4$ is strongly birefringent, there is more than a 10% difference between the indices of refraction for the two crystallographic axes. It should be understood that while the axes of Nd:YVO$_4$ are described in this embodiment, other crystals with different axes orientations could be mounted in similar ways to achieve a similar effect. This includes both uniaxial and biaxial crystals.

In FIG. 3, the gain medium 26 is mounted in a heat sink 100 for thermal stability. Heat sink 100 can be made of copper or other suitable materials, such as aluminum or aluminum nitride. As one example, heat sink 100 can be configured as separate sections 101, 102. Solder can be deposited on the four side surfaces of the gain medium 26, as well as the joint surfaces of heat sink sections 101, 102, to reduce thermal impedance between the faces of the gain medium 26 and the heat sink 100. Preferably, the solder has a low melting temperature. Suitable solders include, but are not limited to, Indium Solder 1E, available from the Indium Corporation of America, Utica, N.Y., and pure indium, also available from the Indium Corporation. Other possible binding materials include, but are not limited to, thermally conductive adhesives (e.g., epoxies) such as Tra-Bond 2151, available from Tra-Con, Inc., Medford, Mass., as well as thermal greases including Dow Corning 340 and thermal epoxies including Dow Corning 281, available from Dow Corning Corporation, Midland, Mich.

The heat sink 100, and its respective sections 101, 102, can be plated to improve adherence to the solder. Suitable plating materials include but are not limited to chromium, nickel, silver or gold.

Optionally, sections 101 and 102, and gain medium 26 can be pre-metalized with indium prior to assembly. One technique for soldering the gain medium 26 to the heat sink 100 includes wrapping the gain medium in a layer of, for example, 0.001-0.005 inch (about 0.025 to 0.125 mm) indium foil (in one embodiment 0.002 inch (about 0.05 mm)) and positioning the gain medium between sections 101 and 102 of the heat sink 100. Acid cleaning of the indium surface can be helpful to reduce any oxidization on the surface of the indium. The soldering process is preferably performed under a controlled atmosphere (e.g., vacuum and purge with nitrogen, hydrogen, or other reflow gases) to reduce the amount of oxygen. In one technique, a temperature of 10-20° higher than the melting temperature of the solder material is used with a dwell time of, for example, 20 seconds to 5 minutes.

These soldering techniques can provide a laser with a substantially uniform bond between the gain medium 26 and the heat sink 100. The substantially uniform bond can have one or more beneficial properties such as (i) lower stress, (ii) reliability and a long lifetime, and (iii) good thermal conductivity.

To investigate thermal effects, a temperature distribution was calculated for a gain medium made of Nd:YVO$_4$ with pump light power of 50W and where the maximum temp in the pumped volume at the pump input surface is $T_{max}$=108.09° C. Thermo-mechanical properties are particularly important to Nd:YVO$_4$ as can be illustrated by Table I which compares parameters for Nd:YVO$_4$ and Nd:YAG. The pump absorption of Nd:YVO$_4$ is more than 4 times larger than Nd:YAG. This is an advantage for building a small Nd:YVO$_4$ package. However, combined with lower thermal conductivity ($K_c$), thermal lensing may become more severe when the Nd:YVO$_4$ power is scaled up. Also, due to the larger temperature gradient, a larger tensile stress may be formed in Nd:YVO$_4$. The tensile strength of Nd:YVO$_4$ is about 4 times smaller than Nd:YAG, so the fracture damage limit may be more easily reached.

TABLE I

Comparison of Nd:YVO$_4$ and Nd:YAG

| | Absorption coefficient, α (cm$^{-1}$) 808 nm | Heat transfer function, K$_c$ (W/cm K) | α$_T$ (10$^{-6}$ K$^{-1}$) | Thermal optical coefficient, dn/dT (10$^{-6}$ °K$^{-1}$) | Tensile strength (MPa) |
|---|---|---|---|---|---|
| Nd:YVO$_4$ (1.1%) | 31.4 | 0.0523 | 4.43 (a) 11.37 (c) | 8.5 (a) 3.0 (c) | 53 |
| Nd:YAG (1%) | 7.1 | 0.13 | 7.8 | 7.3 | 210 |

The absorption coefficient is assumed to be linearly dependent on doping $$\alpha_r = \alpha_{1.1\%} \frac{r}{1.1\%} \quad (1)$$

where $\alpha_{1.1\%}$ is the absorption at 1.1% doping and r is the doping. It is also assumed that 30% of absorbed pump light energy is lost through heat dissipation (Q). This is somewhat conservative as a quantum efficiency of 24% is assumed in the literature.

YVO$_4$ crystal's indices of refraction are determined using the Sellmeier equation $$n_o^2 = 3.77834 + 0.069736/(\lambda^2 - 0.04724) - 0.0108133\lambda^2 \quad (2)$$

$$n_e^2 = 4.59905 + 0.110534/(\lambda^2 - 0.04813) - 0.0122676\lambda^2 \quad (3)$$

In a thermo-mechanical simulation, the heat transfer function is given by $$-K_c \nabla^2 T(x,y,z) = Q(x,y,z) \quad (4)$$

The boundary condition assumes that a high heat conduction (10$^5$ W/K×cm) exists at the four walls.

Thermal stress is caused by thermal expansion and is represented as a tensor with six independent components: $\sigma_x$, $\sigma_y$, $\sigma_z$, $\sigma_{xy}$, $\sigma_{xz}$, $\sigma_{yz}$. The related mechanical parameters are Young's modulus (E) and Poisson ratio (ν). Stress can be compressive (−) or tensile (+), and the crystal fracture is limited by the tensile stress. The maximum tensile stress is compared with the fracture limit. The boundary condition for the stress calculation sets the normal displacement of the four walls of the gain medium to zero because the walls are constrained.

Optical Path Difference (OPD) is given by $$\frac{d\varphi(x,y,z)}{dz} = \frac{\partial n_e}{\partial T} \Delta T(x,y,z) + (n_e - 1)\varepsilon_{zz} + \sum_{i,j=1}^{3} \frac{\partial n_e}{\partial \varepsilon_{ij}} \varepsilon_{ij}, \quad (5)$$

where the first term on the right hand side is due to temperature change, the second term is due to crystal elongation, and the third is due to the opto-elastic effect. The last term is neglected because it is assumed to be small. Because the laser is polarized along the c-axis, only $n_e$ is involved.

A parabolic shape can approximate the OPD integrated along the z-axis $$\phi(x,y) = \phi(0,0) - (\phi_x x^2 + \phi_y y^2) \quad (6)$$

The thermal lens focal lengths are given by $$f_x = \frac{1}{2\varphi_x n_e} \quad f_y = \frac{1}{2\varphi_y n_e}. \quad (7)$$

An OPD distribution was calculated across the crystal cross-section.

To further reduce the thermal effects of the laser gain medium under optical pumping at relatively high power and to reduce the risk of fracture damage of the pump input surface, a gain medium with a diffusion bonded undoped cap can be used. The undoped cap is generally not a gain portion of the gain medium. The undoped cap is generally the same material as the remainder of the gain medium and oriented with its optical axes coaxial with the doped portion of the gain medium. The cap preferably has the same cross section as the doped portion of the gain medium. In one embodiment, the cap has a length of about 1 to 6 mm, and more preferably about 2 to 4 mm.

Figure 4:
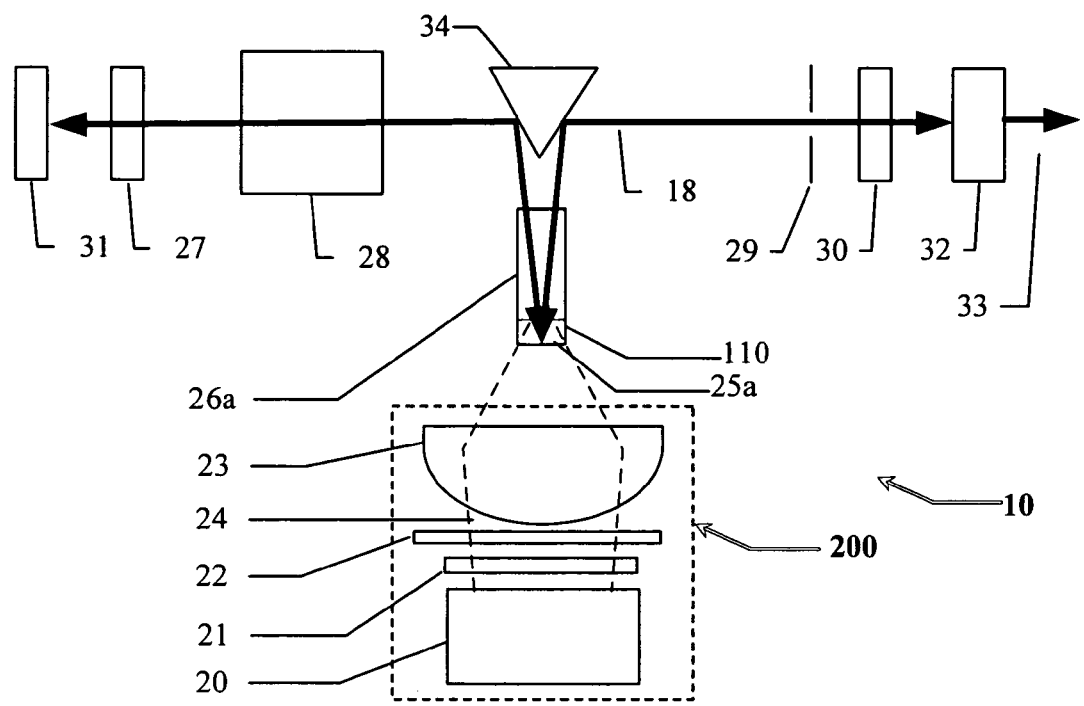
FIG. 4 is a schematic diagram of a second embodiment of a longitudinally end pumped laser having a laser gain medium with a diffuse bonded end cap, according to the invention.

FIG. 4 illustrates another embodiment of a laser head 10 configuration. This laser head includes a diffusion bonded gain medium 26a, such as a diffusion bonded Nd:YVO$_4$ crystal. The pump input end surface 25a of gain medium 26a acts as a first reflector and is highly reflective to the laser wavelength and highly transmissive to the pump light wavelength. For example, the end surface 25a can include one or more coatings to provide the desired optical characteristics. The length of the undoped cap 110 is selected to provide mode matching of the folded cavity mode to the pumped gain volume. In one embodiment, the length of the undoped cap is 2 mm.

As also illustrated in this particular embodiment, the optical axis 18 can be further folded by an optional prism 34 with two highly reflective optical surfaces. The optional prism 34 can be utilized in any of the laser configurations described herein. It will be understood that the laser head of this invention is not limited to this folded cavity configuration; other optical folding methods and components can be utilized to form a variety of cavity configurations.

Figure 5:
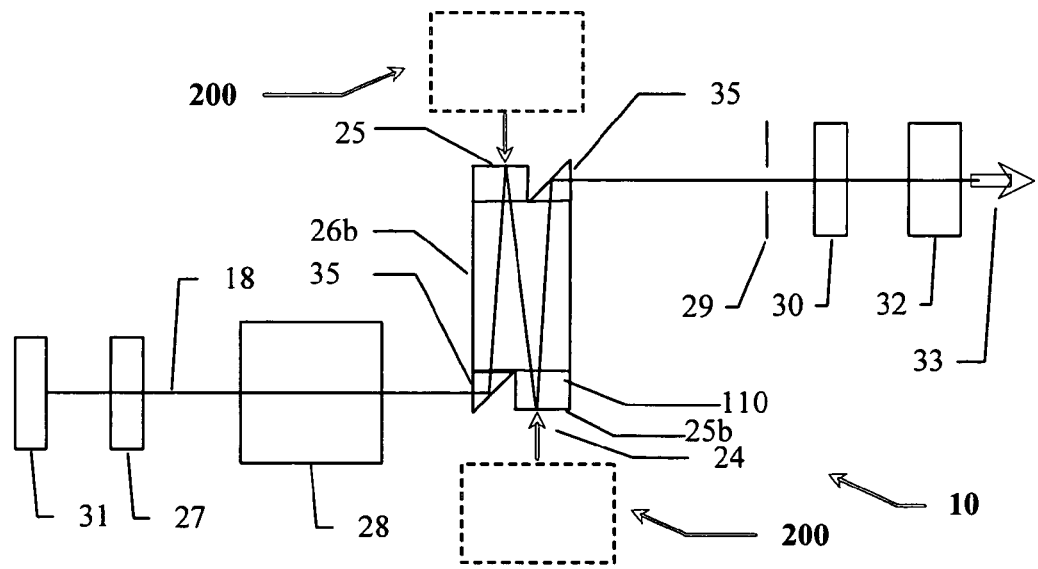
FIG. 5 is a schematic diagram of a third embodiment of a longitudinally end pumped laser having a laser gain medium with a diffuse bonded end cap and prisms to fold the laser beam, according to the invention.

FIG. 5 illustrates another embodiment of a laser head 10. In this configuration, the gain medium 26b is longitudinally end pumped at two different ends by two pump light source modules 200. The first reflectors 25b are one or more coatings, or a discrete reflector element, provided on the respective ends of the gain medium 26. Alternatively, individual first reflectors, such as those illustrated in FIG. 1, can be associated with each pump light source module. Embodiments can also be formed using more than two pump light source modules.

The laser gain medium 26b optionally includes diffuse bonded end caps (as described with respect to the embodiment illustrated in FIG. 4) to receive a pump light beam from each pump light source module. There is a folded beam path through the gain medium 26b with respect to each pump light source module. The end portions of the gain medium pumped by the respective pump light source modules are preferably laterally displaced with respect to each other as illustrated in FIG. 5. This provides to folds through the gain medium. As an alternative embodiment, two or more gain media can be used.

This configuration also illustrates the use of optional prisms 35 to further fold the laser beam. Such prisms can be used in other configurations described herein. The two folding prisms 35 can be bonded to the gain medium 26b or mounted separately. The twice folded path forms an "N" shape through the gain medium. In at least some embodiments, the folding angle at each site in the gain medium is in the range of 4 to 40°. In one embodiment, with two 50 W pumping diode modules, this laser head is capable of 40 W or more of laser output.

Figure 6:
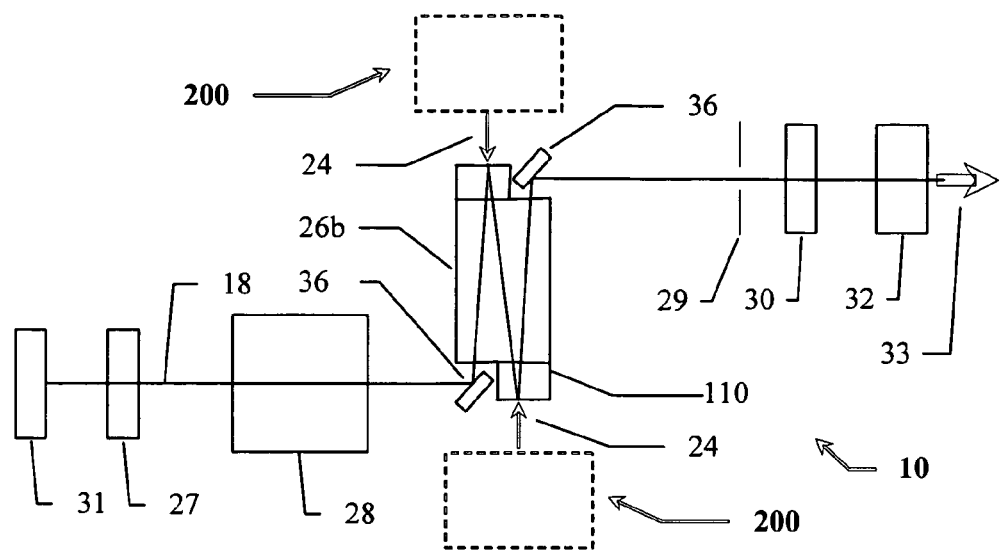
FIG. 6 is a schematic diagram of a fourth embodiment of a longitudinally end pumped laser having a laser gain medium with a diffuse bonded end cap and mini HR mirrors to fold the laser beam, according to the invention.

FIG. 6 illustrates another embodiment of a laser head 10 longitudinally end pumped by two pump light source modules 200 similar to that illustrated in FIG. 5 except that high reflection mirrors 36 are utilized to fold the laser beam instead of prisms 35. Embodiments can also be formed using more than two pump light source modules.

Figure 7:
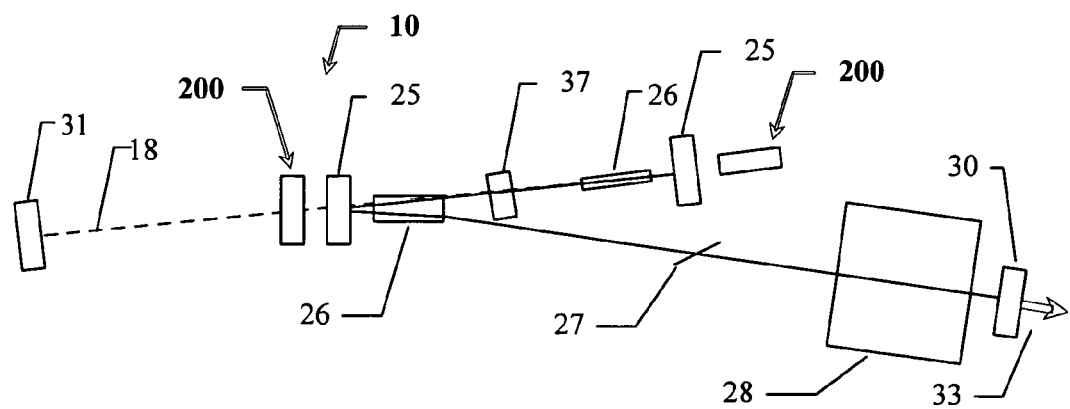
FIG. 7 is a schematic diagram of a fifth embodiment of a longitudinally end pumped laser having a laser gain medium with dynamic astigmatism compensation and 90° spatial orientation difference between the two pump light source modules, according to the invention.

FIG. 7 illustrates a laser head 10 with a dual head cavity for dynamic astigmatism compensation. In FIG. 7, the two pump light source modules 200 are oriented with a 90° spatial angle between the fast axis planes of the two modules. The two laser gain media 26 are also oriented with a 90° spatial angle between the respective "c" axes. The path to reflector 25 is folded out of the plane of FIG. 7 (as represented by the dotted line). For uniaxial gain media, like Nd:YVO$_4$, Nd:YLF or Nd:GdVO$_4$, an optional half wave plate 37 can be used to match polarization. For isotropic gain media, like Nd:YAG or Tm:YAG, an optional half wave Faraday rotator 37 can be used to compensate for depolarization loss. Embodiments can also be formed using more than two pump light source modules and more than two gain media.

Figure 8:
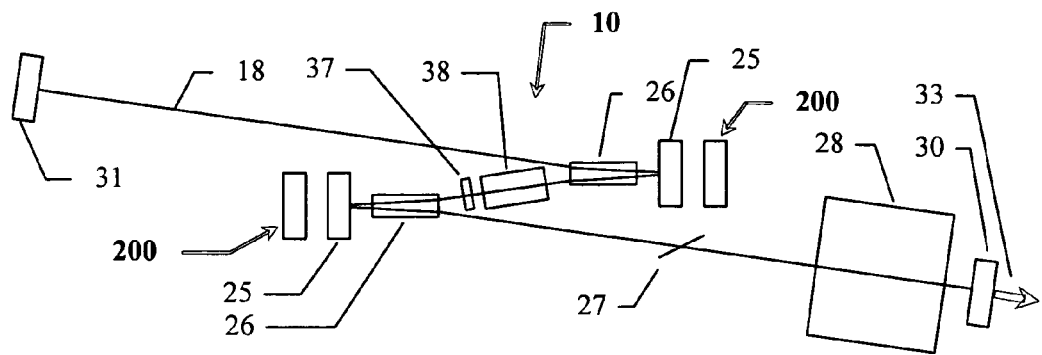
FIG. 8 is a schematic diagram of a sixth embodiment of a longitudinally end pumped laser having a laser gain medium with dynamic astigmatism compensation with a beam cross-section rotator, according to the invention.

FIG. 8 illustrates another embodiment of a laser head 10 with two pump light source modules 200. In this embodiment, the two pump light source modules are oriented in the same direction with respect to each other and the optical axis of the cavity. The laser head 10 can include an optional beam cross-section rotator 38, such as a dove prism, available from Melles Griot, Irvine, or Casix, Fuzhou, China, which can rotate the beam cross-section 90°. For uniaxial gain media, such as Nd:YVO$_4$, Nd:YLF or Nd:GdVO$_4$, an optional half wave plate 37 can be used to match polarization. For isotropic gain media, such as Nd:YAG or Tm:YAG, an optional half wave Faraday rotator 37 can be used to compensate for depolarization loss. Embodiments can also be formed using more than two pump light source modules and more than two gain media.

Figure 9:
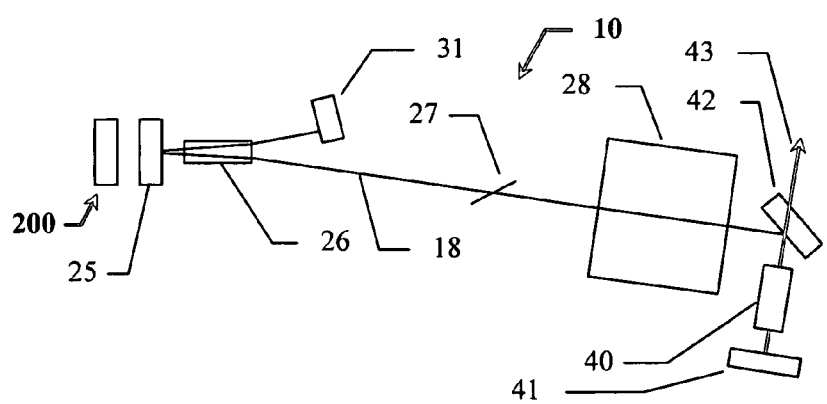
FIG. 9 is a schematic diagram of a seventh embodiment of a longitudinally end pumped laser providing second harmonic generation, according to the invention.

FIG. 9 illustrates yet another laser head 10. This configuration includes a second harmonic generation module 40. The laser cavity is similar to that in FIG. 1 (or any of the other configurations described herein). In this particular embodiment, to accommodate the second harmonic generation (SHG) module 40, the optical axis is optionally folded about 90° by a flat reflector 42 (e.g., a mirror), which is highly reflective for light having s-polarization at the fundamental laser wavelength and highly transmissive for light having p-polarization at the second harmonic wavelength. End mirror 41 is highly reflective for both the fundamental and second harmonic wavelengths. It will be recognized that other configurations can be used to accommodate the second harmonic generation module.

The second harmonic generation module 40 can be any suitable second harmonic generator including, but not limited to, a non-critical phase matching (NCPM) or a critical phase matching (CPM) LBO (lithium triborate) Type-I crystal. Other types of second harmonic generators can also be used. In one embodiment, a CPM Type-I LBO is used as the second harmonic generation module 40. For example, a 3×3×15 mm crystal can be provided with critical phase matching angle cuts for a working temperature of approximately 45° C. at normal incident angle of the fundamental beam.

In at least some embodiments, high harmonic conversion efficiency can be achieved by appropriate LBO crystal lengths and fundamental beam sizes in the second harmonic generation module 40. The fundamental beam waist for the second harmonic generation module 40 is formed by the combination of the thermal lens of the laser gain medium and the reflector 41. TEM$_{00}$ operation is selected by an appropriate ratio of the cavity mode size to the aperture represented by the laser gain medium.

Figure 10:
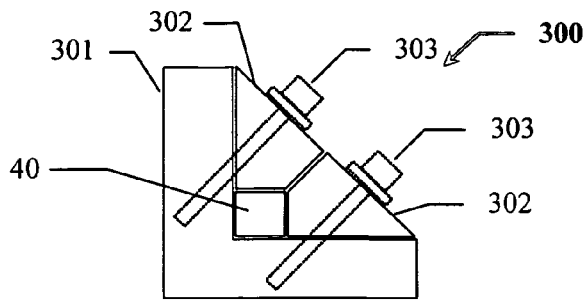
FIG. 10 is a schematic cross-section of a harmonic generation crystal mounted in a heat sink assembly, according to the invention.

As illustrated in FIG. 10, thermal effects on a second harmonic generation module 40 (e.g., a harmonic generation crystal) can be reduced by mounting to a heat sink 300. Heat sink 300 can be made of copper or any other suitable materials such as, for example, aluminum or aluminum nitride. The heat sink 300 and its attachment to second harmonic generation module 40 are similar to that described above with respect to the heat sink 100 and the gain medium 26, illustrated in FIG. 3. The heat sink 300 can be constructed alternatively with optional screws 303 and without soldering or gluing. This may be beneficial for disassembling module 300 for repair or service of the device. When assembling with screws 303, the pre-metalized second harmonic generation module 40 can be wrapped with, for example, indium foil prior to assembly. The indium foil can be, for example, 0.001 to 0.005 inch (about 0.025 to 0.125 mm) thick.

Figure 11:
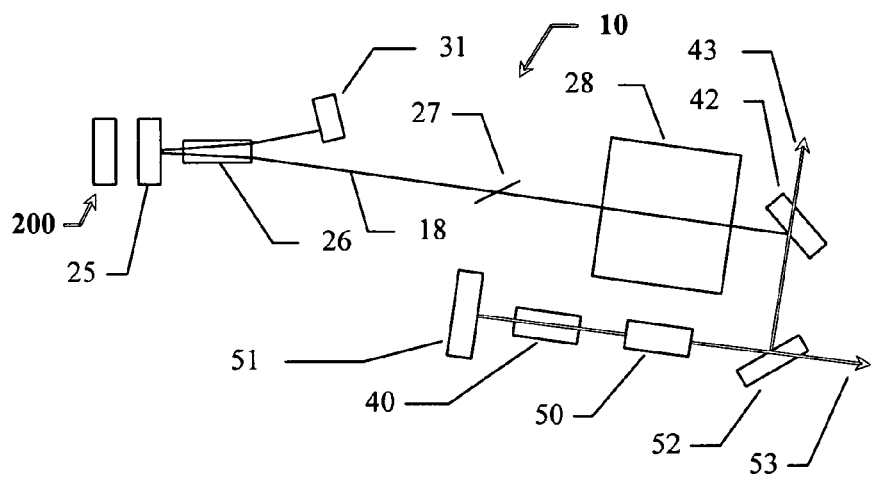
FIG. 11 is a schematic diagram of an eighth embodiment of a longitudinally end pumped laser providing third harmonic generation, according to the invention.

FIG. 11 illustrates a pumped solid-state laser head with intra-cavity third harmonic generation. In the illustrated embodiment, the device includes a second harmonic generation module 40 (e.g., a doubling crystal), a third harmonic generation module 50 (e.g., a tripling crystal), a diode-pumped laser crystal 26, and a Q-switch 28 contained within a single cavity defined by reflectors 31, 25, 42, 52 and 51. In one illustrative embodiment, a fundamental laser beam is generated at 1064 nm, and within the cavity itself a second harmonic beam is generated at 532 nm, and a third harmonic beam is generated at 355 nm. In the illustrated embodiment, both the second and third harmonic beams can be output. Preferably, the reflector 52 (e.g., a mirror) is selected (e.g., coated) to permit the output coupling of substantially only the third harmonic beam. The mirror 42 is selected to allow the output coupling of the second harmonic beam while highly reflective to the fundamental beam. In alternative embodiments, the laser head may only generate or output a third harmonic beam.

Figure 12:
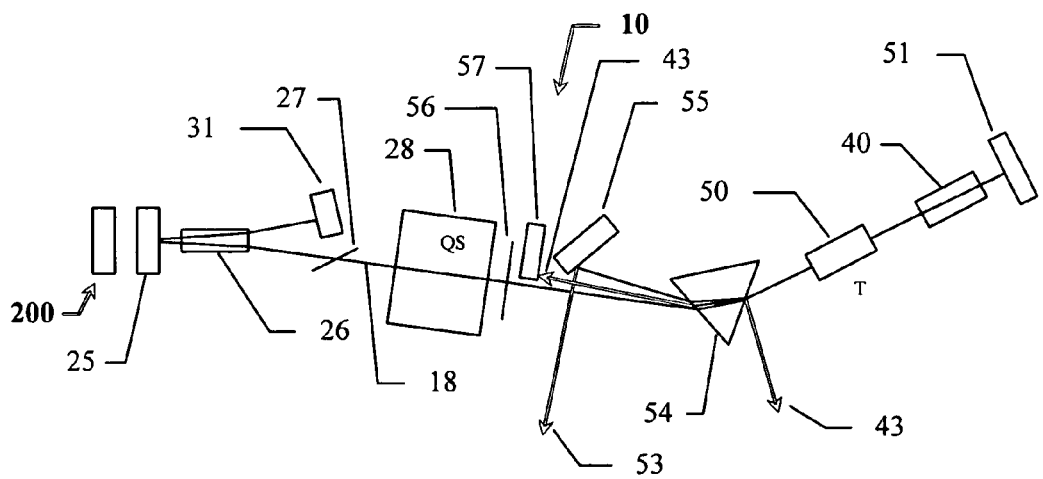
FIG. 12 is a schematic diagram of a ninth embodiment of a longitudinally end pumped laser providing third harmonic generation, according to the invention.

FIG. 12 illustrates yet another embodiment of a laser head 10 implemented as a variant form to the embodiment illustrated in FIG. 11. This embodiment includes additional elements to more efficiently extract the third harmonic beam without disturbing the fundamental beam or the second harmonic beam. This embodiment includes an intra-cavity Q-switch 28, a gain medium 26, an intra-cavity second harmonic generation module 40, an intra-cavity third harmonic generation module 50, and reflectors 31, 25 and 51. In addition, this embodiment includes a dispersive prism 54 and a pick-off reflector 55. The fundamental laser beam generated in the laser gain medium 26 is electrically polarized perpendicular to the plane of FIG. 12. Upon passing through the Q-switch 28 and half wave plate 56, the polarization is rotated into the plane of FIG. 12. The beam passes with negligible loss through the dispersive prism 54 and into second harmonic generation module 40 and third harmonic generation module 50. Both the fundamental beam and the third harmonic beam 53 are co-polarized in the plane of FIG. 12. At the prism 54, because the second harmonic beam 43 (SH) is in s-polarization with respect to the prism's surface, as much as 20% of the second harmonic beam is reflected off the prism 54 surface. Part of the second harmonic beam 43 passes through the dispersive prism 54 and enters beam dump 57. The third harmonic beam 53 is transferred with very little loss through the prism 54 and is deviated thereby at a slight angle (a few degrees) with respect to the fundamental beam, and then extracted with the pick-off mirror 55 from the cavity without (or with little) loss.

High harmonic conversion efficiency can be achieved by selecting, for example, appropriate LBO crystal length and fundamental beam size. The fundamental beam waist for the LBO doubler/tripler pair (40 and 50, respectively) is formed by the combination of the thermal lens of the laser gain medium and the reflector 51. $TEM_{00}$ operation is selected by an appropriate ratio of the cavity mode size to the aperture represented by the laser gain medium. As suggested above, the third harmonic radiation, polarized co-planar to the fundamental radiation, is extracted with negligible loss by the combination of the intra-cavity prism 54 (e.g., a Brewster dispersive prism) and the pick-off mirror 55.

Examples of suitable harmonic generation modules include both non-critical phase matching (NCPM) and critical phase matching (CPM) LBO Type-I crystals. In one embodiment, a CPM Type-I LBO is used as the second harmonic generation module 40, and a CPM Type II LBO is used for third harmonic generation (THG) module 50. These crystals can be optionally mounted on temperature-controlled platforms, each of which may be coarsely adjusted by its mechanical mounts and fine-tuned by temperature with an accuracy of ±0.01° C. In one specific example, the working temperature is set around 45° C., which is approximately 20° C. higher than room temperature, for easy temperature stability control and long service lifetime of the harmonic crystals. The second harmonic generation module 40 generates a second harmonic beam, which exits from each of its ends. The beam, which exits the second harmonic generation module face closest to the third harmonic generation module 50, can be summed with the intra-cavity fundamental beam to generate radiation at the third harmonic 53 of the fundamental. The beam which exits the second harmonic generation module face opposite the third harmonic generation module would likely be lost were it not for the mirror coating on reflector 51 which is designed to reflect both the fundamental and second harmonic beams, thereby recycling the second harmonic beam.

Figure 13:
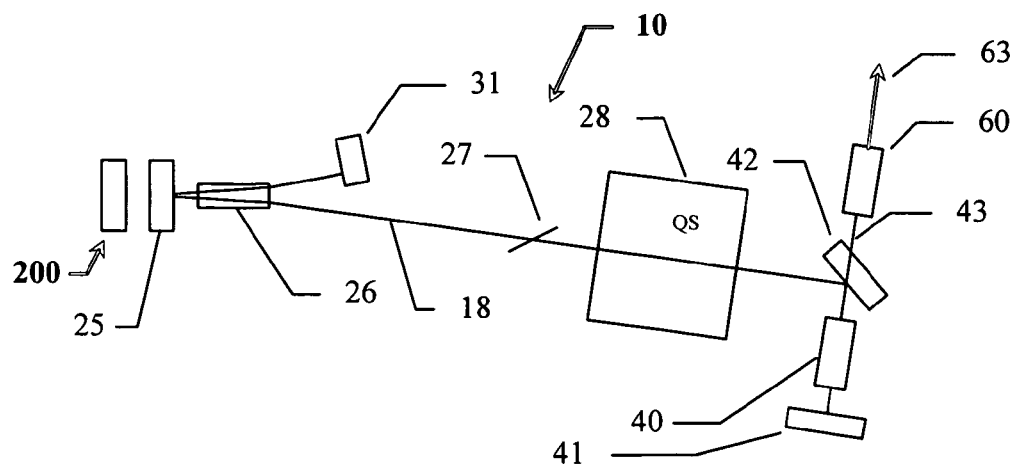
FIG. 13 is a schematic diagram of a tenth embodiment of a longitudinally end pumped laser providing fourth harmonic generation, according to the invention.

FIG. 13 illustrates an embodiment of a laser head 10 with an external cavity fourth harmonic generation (FHG) module 60 and an intra cavity second harmonic generation (SHG) module 40. A pump light source module 200 pumps the gain medium 26. In the illustrated embodiment, to accommodate the second harmonic generation (SHG) module 40, the optical axis is folded about 90° by a flat reflector 42 (e.g., a coated mirror), which is highly reflective for s-polarization at the fundamental wavelength and highly transmissive for p-polarization at the second harmonic wavelength. End reflector 41 (e.g., a mirror) is highly reflective for both the fundamental and second harmonic wavelengths. The second harmonic output 43, is fed into another second harmonic generation module 60 to produce the fourth harmonic beam 63. For the fourth harmonic generation module 60, a BBO Type-I crystal is preferred. It will be recognized that a variety of other configurations can be used to produce second, third, fourth, or higher harmonic beams. The configurations illustrated herein are examples.

In one method of manufacture, the laser is assembled in a sealed, dry enclosure (as an example, an enclosure of roughly 152 mm×394 mm×76 mm) containing all optical components, including the pump laser source. The sealed enclosure reduces the risk of optical damage caused by the buildup of contaminants from room air and allows cooling of the pump laser source to temperatures that would otherwise be below the dew point. Cooling is applied to the exterior of the enclosure and heat is transferred from various internal electrical and optical components via thermoelectric coolers. The power supply and control electronics can be housed, for example, in an auxiliary rack-style enclosure. For one embodiment, total electrical power consumption in worst-case conditions is roughly 500 Watts. The laser head generates over 3 Watts maximum average power at 355 nm and operates at repetition rates of 100 kHz or more. This particular system uses a $Nd:YVO_4$ crystal pumped by a 40 watt diode bar and incorporates intra-cavity Type I and Type II LBO angle-tuned second and third harmonic generation modules, respectively.

Although the present invention has been described above in terms of a specific embodiment, it is anticipated that alterations and modifications thereof will be apparent to those skilled in the art. For example, for lower power CW laser applications, the Q-switch could be omitted.

Figure 14:
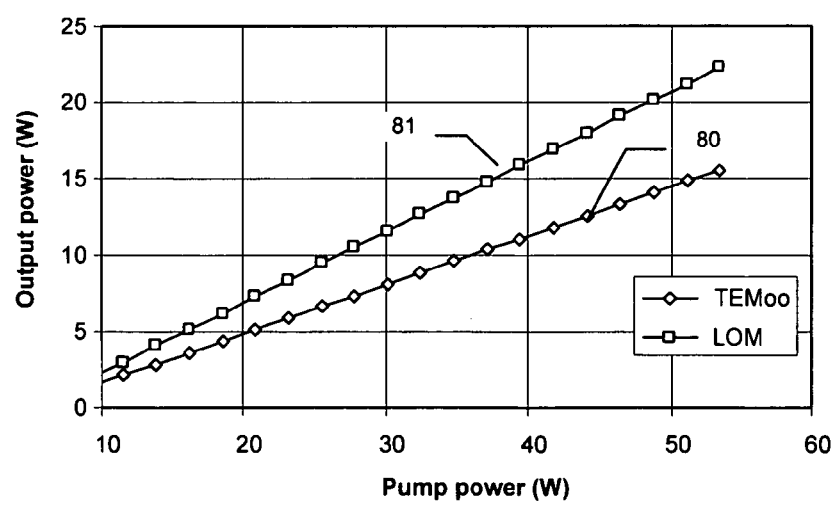
FIG. 14 is a one example of a graph of pump power versus output power for one embodiment of a laser of the present invention with one pump light source pumping from one end of the gain medium.

One embodiment of the laser can have the following characteristics: output powers in the range of about 1 to 20 W; an overall optical efficiency at least about 27% for the $TEM_{oo}$ mode and at least 40% for LOM ($M^2$ about 4-5); an optical slope efficiency in the $TEM_{00}$ mode of at least 32% and at least 46% for LOM ($M^2$ about 4-5). FIG. 14 is one example of a graph of pump power versus output power for one embodiment of a laser with one pump light source pumping from one end of the gain medium. With an undoped end cap and thermal management, the thermal stress on the laser gain medium at the input end can be reduced. Since the laser performance curve in FIG. 14 show no tendency towards saturation because of thermal stress by over pumping, further enhancement of output power is expected when a higher power diode bar or stack becomes is used for pumping.

The laser is useful in a variety of applications including, but not limited to, material processing, medical therapeutic applications, instrumentation, research, telecommunications, optical storage, entertainment, image recording, inspection, measurement and control, barcode scanning, and sensing.

Additionally, the laser can be Q-switched or mode locked, and used to generate harmonics or pump optical parametric oscillators.

The above specification, examples and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. A laser apparatus for producing a laser light beam, comprising: a first gain medium comprising opposing first and second ends; a first pump light source configured and arranged to provide a pump light beam to the first end of the first gain medium, wherein, at the first end of the first gain medium, the pump light beam has an elliptical, non-circular cross-section; a first reflector disposed between the first end of the first gain medium and the first pump light source and spaced apart from a gain portion of the first gain medium, wherein the first reflector is substantially reflective to the laser light beam and substantially transmissive to the pump light beam; a second reflector; and an output coupler; wherein the first and second reflectors and the output coupler define a folded beam path having a first portion and a second portion, the first portion of the beam path extending from the first reflector to the second reflector through the first gain medium and the second portion of the beam path extending from the first reflector to the output coupler through the first gain medium, the first and second beam paths defining, within the first gain medium, a non-zero folding angle between the first and second beam paths, wherein the pump light beam is directed in a direction between the first and second beam paths and not along either the first or second beam path, and wherein entrance points of the beam path from the first reflector into the first gain medium overlap less than 25%.

2. The laser apparatus of claim 1, wherein the folding angle is at least 4 degrees.

3. The laser apparatus of claim 1, wherein the folding angle is in the range of 4 degrees to 40 degrees.

4. The laser apparatus of claim 1, wherein the folding angle is in the range of 10 degrees to 20 degrees.

5. The laser apparatus of claim 1, further comprising a second pump light source to provide a second pump light beam to the second end of the first gain medium, wherein the second reflector is disposed between the second pump light source and the second end of the first gain medium and spaced apart from a gain portion of the first gain medium.

6. The laser apparatus of claim 1, further comprising a second pump light source, a second gain medium, and a third reflector, the second gain medium having a first end,
wherein the second pump light source is configured and arranged to provide a pump light beam to the first end of the second gain medium and
wherein the second reflector is disposed between the second pump light source and the second gain medium, is spaced apart from a gain portion of the second gain medium, and is substantially reflective to the laser light beam and substantially transmissive to the pump light beam and
wherein the second gain medium is disposed along the first beam path, but not the second beam path and
wherein the third reflector is disposed to form a third portion of the folded beam path, the third portion of the beam path extending from the second reflector to the third reflector through the second gain medium, with the first and third beam paths defining, within the second gain medium, a second non-zero folding angle between the first and third beam paths.

7. The laser apparatus of claim 1, further comprising a prism configured and arranged to receive the laser light beam from the first gain medium along the first and second portions of the folded beam path and to further fold the laser light beam toward the second reflector and output coupler, respectively.

8. The laser apparatus of claim 1, further comprising a second harmonic generation module configured and arranged to receive at least a portion of the laser light beam.

9. The laser apparatus of claim 1, further comprising a third harmonic generation module configured and arranged to receive at least a portion of the laser light beam.

10. The laser apparatus of claim 9, further comprising a second harmonic generation module configured and arranged to receive at least a portion of the laser light beam.

11. The laser apparatus of claim 10, further comprising a reflector configured and arranged to receive the laser light beam from the second and third harmonic generation modules and substantially transmit a one of a second harmonic wavelength and a third harmonic wavelength and reflect a substantial portion of another one of the second harmonic wavelength and third harmonic wavelength.

12. The laser apparatus of claim 10, further comprising a prism configured and arranged to reflect a substantial portion of a one of a second harmonic wavelength and a third harmonic wavelength and to substantially transmit, without reflecting a substantial portion of, another one of the second and third harmonic wavelengths.

13. The laser apparatus of claim 1, further comprising a fourth harmonic generation module configured and arranged to receive at least a portion of the laser light beam.

14. A method of using a laser apparatus to generate a laser light beam, the method comprising: providing a laser cavity comprising a first gain medium; a first reflector spaced apart from a gain portion of the first gain medium;
a second reflector; and an output coupler; wherein the first and second reflectors and the output coupler define a folded beam path having a first portion and a second portion, the first portion of the beam path extending from the first reflector to the second reflector through the first gain medium and the second portion of the beam path extending from the first reflector to the output coupler through the first gain medium, the first and second beam paths defining, within the first gain medium, a non-zero folding angle between the first and second beam paths; and pumping the first gain medium using a pump light beam passing through the first reflector to a first end of the first gain medium, wherein the pump light beam is directed in a direction between the first and second beam paths and not along either the first or second beam path, and the pump light beam has an elliptical, non-circular cross-section at the first end of the first gain medium, and the first reflector is substantially reflective to the laser light beam and substantially transmissive to the pump light beam, wherein entrance points of the beam path from the first reflector into the first gain medium overlap less than 25%.

15. The method of claim 14, further comprising providing a second gain medium in the laser cavity and pumping the second gain medium using a second pump light beam, wherein the second gain medium is disposed along the first beam path but not the second beam path.

16. The method of claim 14, further comprising providing a third reflector spaced apart from a gain portion of the first gain medium and pumping the first gain medium using a second pump light beam passing through the third reflector to a second end of the first gain medium.

17. The method of claim 14, further comprising generating a harmonic beam from the laser light beam.

18. The method of claim 17, further comprising separating the harmonic beam from the laser light beam.

19. A laser cavity, comprising: a first gain medium; a first reflector, wherein the first reflector is substantially reflective to a laser light beam and substantially transmissive to a pump light beam and is spaced apart from a gain portion of the first gain medium; a second reflector; and an output coupler, wherein the first and second reflectors and the output coupler define a folded beam path having a first portion and a second portion, the first portion of the beam path extending from the first reflector to the second reflector through the first gain medium and the second portion of the beam path extending from the first reflector to the output coupler through the first gain medium, the first and second beam paths defining, within the first gain medium, a non-zero folding angle between the first and second beam paths, wherein the folding angle is in the range of 10 degrees to 20 degrees, and wherein entrance points of the beam path from the first reflector into the first gain medium overlap less than 25%.

20. The laser apparatus of claim 1, wherein the laser apparatus has a pump light beam power to laser light beam power conversion efficiency of at least 40%.

21. The laser apparatus claim 1, wherein the laser apparatus has a pump light beam power to laser light beam power conversion efficiency of at least 50%.

* * * * *